NEGATIVE RESISTANCE OSCILLATOR

Filed June 27, 1955

INVENTORS
LEOPOLD A. HOROWITZ &
RICHARD W. SONNENFELDT
BY
Charles H. Brown
ATTORNEY United States Patent Office 2,872,580

Patented Feb. 3, 1959

2,872,580

NEGATIVE RESISTANCE OSCILLATOR

Leopold A. Horowitz, Erlton, and Richard W. Sonnenfeldt, Haddonfield, N. J., assignors to Radio Corporation of America, a corporation of Delaware Application June 27, 1955, Serial No. 518,172

8 Claims. (Cl. 250—36)

This invention relates to two-terminal negative resistance or negative transconductance oscillators.

It is an object of this invention to provide an improved and simplified negative resistance oscillator.

It is another object to provide an oscillator including a conventional vacuum tube and capable of oscillation at higher frequencies than are obtainable with conventional prior art circuits.

It is a further object to provide an improved oscillator which utilizes low voltage filament tubes, does not require grid-bias batteries, and is especially suitable for use as a local oscillator in a portable receiver.

According to an illustrative embodiment of the invention, a tuned circuit is connected across the first and third grids of a pentode vacuum tube. A grid return resistor is connected from the first grid to the cathode to negatively bias the first and third grids. The negative terminal of a source of uni-directional potential is connected to a cathode and the positive terminal is connected to the second grid and to the anode. An output is taken from the anode circuit by means of a coupling capacitor or output transformer.

Figure 1:
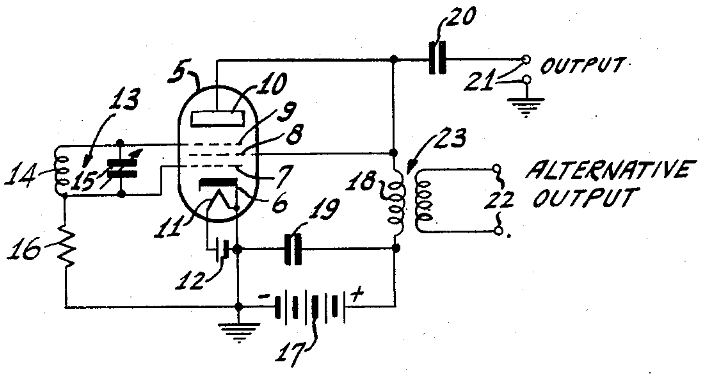
Figure 2:
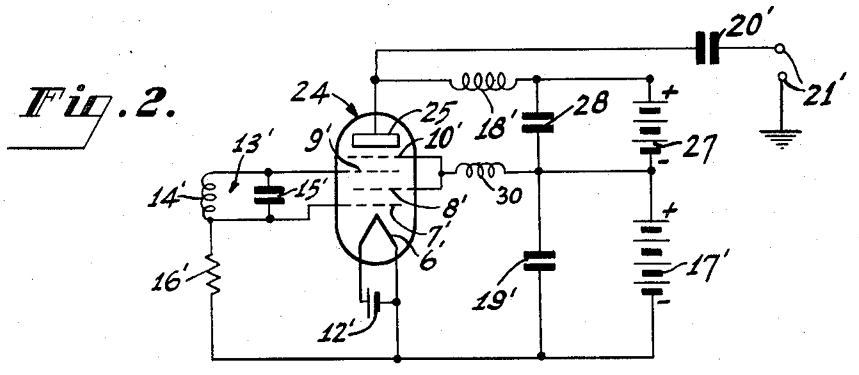

These and other objects and aspects of the invention will be apparent to those skilled in the art from the following more detailed description taken in conjunction with the appended drawing wherein:

Figure 1 is a circuit diagram of an oscillator constructed according to the teachings of this invention; and Figure 2 is a circuit diagram of another oscillator constructed according to the teachings of this invention.

The two-terminal negative resistance oscillator shown in Figure 1 includes a pentode vacuum tube 5 having within an evacuated envelope a cathode 6, a first grid 7, a second grid 8, a third grid 9 and an anode 10, arranged in the order named. The cathode 6 is heated by means of a heater 11 energized from a suitable source of potential 12. A tuned circuit 13, including an inductor 14 and a capacitor 15 connected in parallel, is connected across the first and third grids 7 and 9, respectively. The tuned circuit 13 determines the frequency of oscillation of the oscillator. Either the inductor 14 or the capacitor 15 may be made variable. For the generation of oscillations at high frequencies, the capacitance between the first and third grids 7 and 9 may be sufficiently great so that the capacitor 15 may be omitted.

A grid return resistor 16 is connected from the first grid 7 to the cathode 6. A source 17 of uni-directional potential has its negative terminal connected to the cathode 6 and its positive terminal connected thru an impedance 18 to the second grid 8 and the anode 10. A capacitor 19 provides a radio frequency by-pass around the source 17.

An output appearing across output terminals 21 may be obtained from the anode 10 of the oscillator tube thru a coupling capacitor 20. Alternatively, an output may be obtained at output terminals 22 by means of an output transformer 23 including the impedance 18 in the form of a primary coil of the transformer. If the output is taken from the terminals 21, the output transformer 23 may be omitted. In this latter case, the impedance 18 may be a radio frequency choke coil serving to introduce an impedance at the radio frequency in the anode circuit while permitting the application of the uni-directional potential from the source 17 to the anode 10. In some instances, the impedance 18 may be omitted entirely, or may be an impedance in the form of a resistor.

Descriptions of negative-resistance two-terminal oscillators are given on pages 318 and 509, of "Radio Engineers Handbook" by F. E. Terman, first edition, 1943, McGraw-Hill Book Co., Inc. The vacuum tube of the oscillator circuit of the present invention constitutes a so-called negative resistance in shunt with the frequency determining tank circuit 13. The term "two-terminal oscillators" is applied to oscillators wherein a frequency determining element or tank circuit is connected at its two terminals to the remainder of the oscillator circuit. The two terminals in the oscillator of Fig. 1 are the two terminals on opposite sides of the inductor 14 and capacitor 15. The two terminals of the vacuum tube 10 which present the negative resistance to the tank circuit 13 are the first and third grids 7 and 9, respectively.

An oscillator actually constructed and tested included a type 6AS6 vacuum tube and was connected according to Figure 1 except that a direct connection was substituted for the impedance 18. The circuit was found to oscillate over a range greater than from 160 thru 580 megacycles. The grid return resistor 16 had a valve of 100,000 ohms.

Figure 2 shows a modified form of the invention including a hexode, or six element, vacuum tube 24. A filamentary cathode is designated 6′. Electrodes 7′ thru 10′ correspond with the elements 7 thru 10 in the circuit of Figure 1, except that the electrode 10′ is a grid electrode rather than an anode or plate electrode. The tube 24 includes an additional plate or anode electrode 25. Other circuit elements are given the same numerals as the corresponding elements in Figure 1, with prime designations added. An additional source of uni-directional potential 27 has a negative terminal connected to the positive terminal of the source 17′ and has a positive terminal connected to the anode 25 of the vacuum tube 24. A by-pass capacitor 28 for radio frequency energy is connected across the source 27. An inductor 30 is shown connected between the second and fourth grids 8′, 10′ and the junction of the sources 17′, 27.

A circuit constructed as shown in Figure 2 oscillates even though the source of uni-directional potential 27 is disconnected from the anode 25. However, with the source 27 connected as shown, oscillations of higher amplitude are obtained.

A circuit constructed according to Figure 2 included a type 1R5 vacuum tube, a 1½ volt battery 12′, a 90 volt source 17′, and a second source 27 of about 50 volts. The capacitor 15′ was omitted. The circuit was found to oscillate at frequencies over a range greater than from 8 megacycles to 315 megacycles.

Other tubes which have been found suitable for use in the circuit of this invention are types 6BA7, 5915, 6BE6, 6SB7Y, 6L7, and 6SA7.

The oscillator circuit of the invention is particularly useful as a local oscillator in a portable television receiver.

What is claimed is:

1. A negative resistance oscillator comprising, a vacuum tube including a cathode, a first grid, a second grid, a third grid and a fourth electrode spaced from said cathode in the order named, a tuned circuit connected across said first and third grids, a grid return resistor connected from said first grid over a direct current path to said cathode to maintain said first and third grids at a negative potential with respect to said cathode, and a source of uni-directional potential having a negative terminal connected over a direct current path to said cathode and having a positive terminal connected to said second grid and said fourth electrode.

2. A negative resistance oscillator comprising, a vacuum tube including a cathode, a first grid, a second grid, a third grid and a fourth electrode spaced from said cathode in the order named, a frequency determining circuit connected across said first and third grids, a resistor connected from said first grid to said cathode over a direct current path to maintain said first and third grids at a negative potential with respect to said cathode, and a source of uni-directional potential having a negative terminal connected to said cathode over a direct current path and having a positive terminal connected to said second grid and said fourth electrode.

3. A negative resistance oscillator comprising, a vacuum tube including a cathode and first, second, third and fourth additional electrodes spaced from said cathode in the order named, a frequency determining inductor connected across said first and third electrodes, a resistor connected from said first electrode to said cathode over a direct current path to maintain said first and third electrodes at a negative potential with respect to said cathode, an output circuit impedance, and a source of uni-directional potential having a negative terminal connected to said cathode over a direct current path and having a positive terminal connected thru said output impedance to said second and fourth electrodes.

4. A negative resistance oscillator comprising, a vacuum tube including a cathode and first, second, third and fourth grids and an anode spaced from said cathode in the order named, a tuned circuit connected across said first and third grids, a resistor connected from said first grid to said cathode to maintain a negative self bias on said first and third grids, a first source of uni-directional potential having a negative terminal connected to said cathode and having a positive terminal connected to said second and fourth grids, and a second source of uni-directional potential having a negative terminal connected to the positive terminal of said first source and having a positive terminal connected to said anode.

5. An oscillator capable of generating a wide band of frequencies in the megacycle range comprising a vacuum tube including a cathode and an anode, first, second and third grids positioned between said cathode and said anode in the path of the electron stream traveling from said cathode to said anode, a frequency determining circuit connected across said first and third grids, a resistor connected from said first grid to said cathode over a direct current path to maintain said first and third grids at a negative potential with respect to said cathode, and a source of uni-directional potential having a negative terminal connected to said cathode over a direct current path and having a positive terminal connected to said second grid and said anode.

6. A two terminal negative resistance oscillator comprising, a vacuum tube having a cathode, a first grid, a second grid, a third grid and an anode arranged in the order named, a tuned circuit having two terminals connected to said first and third grids, means to negatively self bias said first and third grids with respect to said cathode, and means to positively bias said second grid and said anode with respect to said cathode.

7. A two-terminal negative resistance oscillator comprising, a vacuum tube having a cathode, first, second, third and fourth grids and an anode arranged in the order named, a tuned circuit having two terminals connected between said first and third grids, a resistor connected between said first grid and said cathode over a direct current path to maintain said first and third grids at a negative potential with respect to said cathode, and means to positively bias said second and fourth grids and said anode with respect to said cathode.

8. A negative resistance oscillator comprising a vacuum tube including a cathode and first, second, third and fourth grids and an anode spaced from said cathode in the order named, a tuned circuit connected across said first and third grids, a resistor connected from said first grid to said cathode to maintain a negative self bias on said first and third grids, a source of uni-directional potential having a negative terminal connected to said cathode and having a positive terminal connected to said anode, said source having an additional terminal located between said negative and positive terminals, and means for connecting said second and fourth grids to said additional terminal.

References Cited in the file of this patent

UNITED STATES PATENTS

| | | |
|---|---|---|
| 2,119,357 | Schalkwijk | May 31, 1938 |
| 2,231,687 | Shepard | Feb. 11, 1941 |
| 2,248,797 | Waller | July 8, 1941 |
| 2,265,397 | Rothe | Dec. 9, 1941 |
| 2,492,767 | Reynolds | Dec. 27, 1949 |

FOREIGN PATENTS

| | | |
|---|---|---|
| 490,500 | Great Britain | Aug. 16, 1938 |